United States Patent
Sato

(10) Patent No.: US 10,773,558 B2
(45) Date of Patent: Sep. 15, 2020

(54) PNEUMATIC TIRE

(71) Applicant: TOYO TIRE & RUBBER CO., LTD., Osaka-shi, Osaka (JP)

(72) Inventor: Yoshiki Sato, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 329 days.

(21) Appl. No.: 15/493,343

(22) Filed: Apr. 21, 2017

(65) Prior Publication Data
US 2018/0170119 A1  Jun. 21, 2018

(30) Foreign Application Priority Data

Dec. 15, 2016 (JP) ................................ 2016-243382

(51) Int. Cl.
   *B60C 13/02* (2006.01)
   *B60C 11/01* (2006.01)

(52) U.S. Cl.
   CPC .............. *B60C 13/02* (2013.01); *B60C 11/01* (2013.01); *B60C 2200/14* (2013.01)

(58) Field of Classification Search
   CPC ..... B60C 13/00; B60C 13/001; B60C 13/002; B60C 13/003; B60C 13/02; B60C 13/023
   See application file for complete search history.

(56) References Cited

U.S. PATENT DOCUMENTS

| | | | |
|---|---|---|---|
| 8,534,336 B2 * | 9/2013 | Ohara | B60C 13/02 152/523 |
| 9,174,499 B2 * | 11/2015 | Yamaguchi | B60C 11/0309 |
| 2010/0288409 A1 | 11/2010 | Ohara | |
| 2013/0139936 A1 | 6/2013 | Ohara | |

FOREIGN PATENT DOCUMENTS

| | | | |
|---|---|---|---|
| JP | 2004-291937 | * | 10/2004 |
| JP | 2009-149181 | * | 7/2009 |
| JP | 2010-264962 A | | 11/2010 |
| JP | 2013-119277 A | | 6/2013 |

OTHER PUBLICATIONS

Machine translation of JP 2004-291937, 2004.*

* cited by examiner

*Primary Examiner* — Justin R Fischer
(74) *Attorney, Agent, or Firm* — Westerman, Hattori, Daniels & Adrian, LLP

(57) ABSTRACT

A pneumatic tire includes a sidewall portion extending in a tire radial-direction. The sidewall portion includes a plurality of projecting portions projecting in a tire width-direction, and at least one reinforcing portion which is at least partly different in a projecting amount from a projecting amount of the projecting portions at the same position in the tire radial-direction, and is connected to the projecting portion in a tire circumferential-direction.

18 Claims, 3 Drawing Sheets

PNEUMATIC TIRE

CROSS REFERENCE TO RELATED APPLICATIONS

This application claims the benefit of priority of Japanese application no. 2016-243382, filed on Dec. 15, 2016, which is incorporated herein by reference.

BACKGROUND OF THE INVENTION

Field of the Invention

The present invention relates to a pneumatic tire having a plurality of projecting portions which project in a tire width-direction.

Description of the Related Art

There are conventionally known pneumatic tires each having a plurality of projecting portions which project in a tire width-direction (for example, JP-A-2010-264962 and JP-A-2013-119277). According to a structure of this pneumatic tire, traction performance on a mud area or a rocky area is enhanced due to resistance caused when the projecting portions shear dirt and due to friction between the projecting portions and rock. In the case that the projecting portions greatly deform in a tire circumferential-direction, the traction performance of the projecting portions cannot be sufficiently exhibited.

SUMMARY OF THE INVENTION

It is an object of the present invention to provide a pneumatic tire capable of sufficiently exhibiting traction performance of projecting portions.

There is provided a pneumatic tire, which includes:

a sidewall portion extending in a tire radial-direction, wherein the sidewall portion includes a plurality of projecting portions projecting in a tire width-direction, and at least one reinforcing portion which is at least partly different in a projecting amount from a projecting amount of the projecting portions at the same position in the tire radial-direction, and is connected to the projecting portion in a tire circumferential-direction.

Also, the pneumatic tire may have a configuration in which:

at least one of the reinforcing portions is connected to a rear side of the projecting portions in a tire rotation direction.

Also, the pneumatic tire may have a configuration in which:

an outer end of the reinforcing portion in the tire radial-direction is located on an outer side in the tire radial-direction than outer ends of the projecting portions in the tire radial-direction.

Also, the pneumatic tire may further have a tread portion which is connected to an outer end of the sidewall portion in the tire radial-direction, wherein the tread portion includes a plurality of grooves extending to an outer end in the tire width-direction, and wherein at least one of the grooves is communicated with space portions which are formed by the plurality of projecting portions and the reinforcing portion being arranged along the tire circumferential-direction.

Also, the pneumatic tire may have a configuration in which:

the projecting portions and the reinforcing portion are placed such that at least portions of the projecting portions and the reinforcing portion are superposed on only one of the plurality of blocks in the tire radial-direction as viewed in the tire width-direction.

Also, the pneumatic tire may have a configuration in which:

an inner end of the reinforcing portion in the tire radial-direction is located on an inner side in the tire radial-direction than inner ends of the projecting portions in the tire radial-direction.

Also, the pneumatic tire may have a configuration in which:

an outer end of the projecting portion in the tire radial-direction is located on an inner side in the tire radial-direction than an outer end of the tread surface of the block in the tire width-direction.

Also, the pneumatic tire may have a configuration in which:

an outer end of the reinforcing portion in the tire radial-direction is located on an inner side in the tire radial-direction than an outer end of the tread surface of the block in the tire width-direction.

Also, the pneumatic tire may further have an annular protrusion portion placed between the projecting portions which are adjacent away or between the projecting portion and the reinforcing portion which are adjacent away, and formed into an intermittently annular shape.

Also, the pneumatic tire may have a configuration in which:

the projecting amount of the annular protrusion portion is 60% to 130% of the projecting amount of the projecting portion at the same position in the tire radial-direction.

Also, the pneumatic tire may have a configuration in which:

the projecting amount of the reinforcing portion is the same as the projecting amount of the projecting portion at the same position in the tire radial-direction on an outer side in the tire radial-direction than the annular protrusion portion, and is smaller than the projecting amount of the projecting portion at the same position in the tire radial-direction on an inner side in the tire radial-direction than the annular protrusion portion.

Also, the pneumatic tire may have a configuration in which:

the projecting amount of the reinforcing portion is equal to or more than 20% of the projecting amount of the projecting portion at the same position in the tire radial-direction.

Also, the pneumatic tire may have a configuration in which:

a width of the projecting portions in a tire circumferential-direction is greater than a width of the reinforcing portion in the tire circumferential-direction.

Also, the pneumatic tire may have a configuration in which:

the width of the reinforcing portion in the tire circumferential-direction is equal to or more than 25% of the width of the projecting portion in the tire circumferential-direction.

Also, the pneumatic tire may have a configuration in which:

the width of the reinforcing portion in the tire circumferential-direction is equal to or more than 40% of the width of the projecting portion in the tire circumferential-direction.

Also, the pneumatic tire may have a configuration in which:

a length of the reinforcing portion in the tire radial-direction is equal to or more than 20% of a length of the projecting portion in the tire radial-direction.

Also, the pneumatic tire may have a configuration in which:

the length of the reinforcing portion in the tire radial-direction is equal to or more than 50% of the length of the projecting portion in the tire radial-direction.

Also, the pneumatic tire may have a configuration in which:

a length of the reinforcing portion in the tire radial-direction is equal to or less than 150% of a length of the projecting portion in the tire radial-direction.

Also, the pneumatic tire may have a configuration in which:

the length of the reinforcing portion in the tire radial-direction is equal to or less than 120% of the length of the projecting portion in the tire radial-direction.

Also, the pneumatic tire may have a configuration in which:

the length of the reinforcing portion in the tire radial-direction is equal to or less than 100% of the length of the projecting portion in the tire radial-direction.

DETAILED DESCRIPTION OF THE PREFERRED EMBODIMENTS

An embodiment of a pneumatic tire will be described below with reference to FIGS. 1 to 3. Size ratios in each of the drawings do not always match with actual size ratios, and size ratios between the drawings do not always math with each other.

Figure 1:
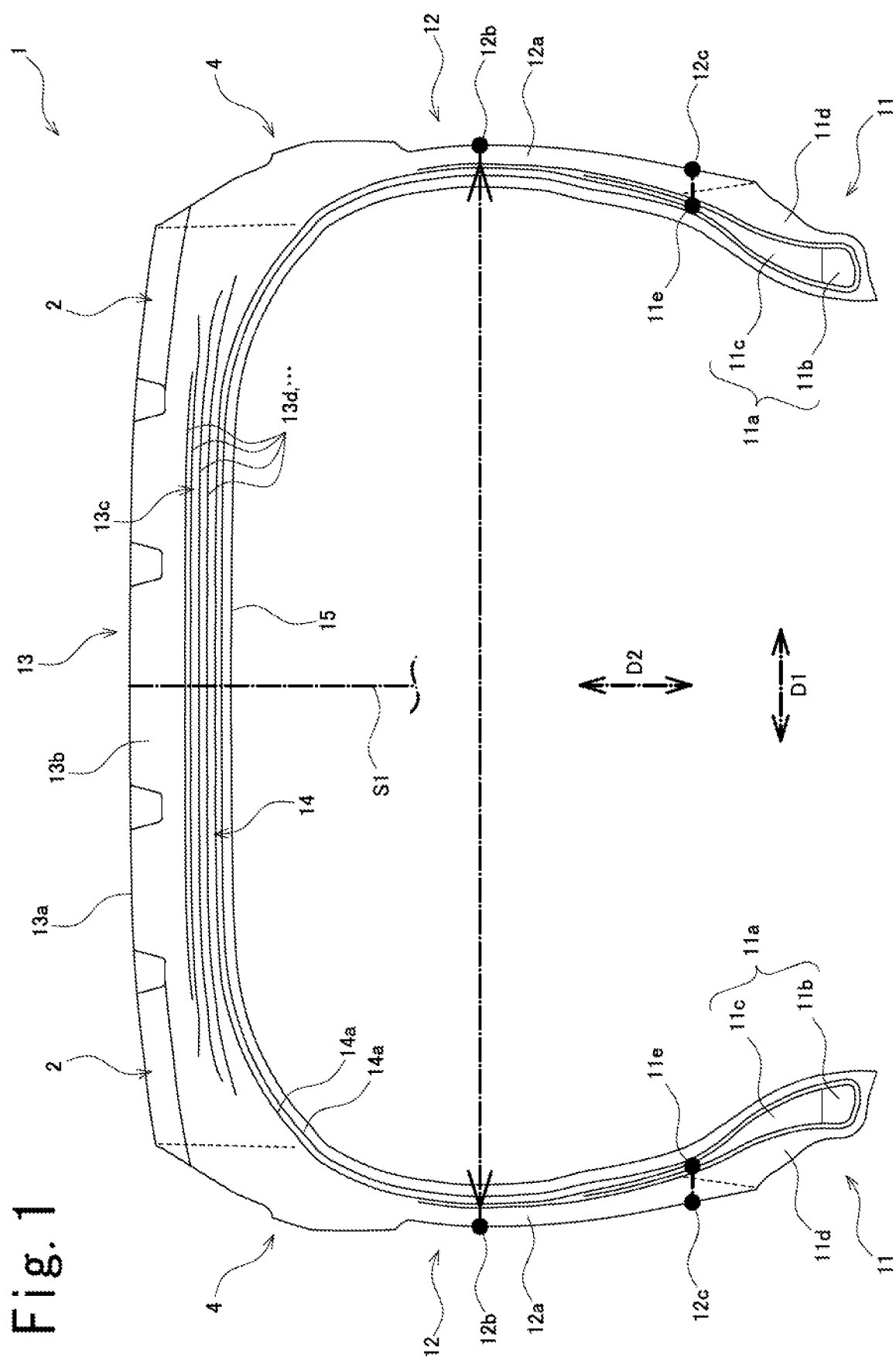
FIG. 1 is a sectional view of essential portions in a tire meridional surface of a pneumatic tire according to an embodiment.

As shown in FIG. 1, the pneumatic tire (also called "tire" simply) 1 includes a pair of bead portions 11 having beads 11a. The tire 1 includes sidewall portions 12 extending from the bead portions 11 radially outward in a tire radial-direction D2, and a tread portion 13 which is connected to outer ends of the pair of sidewall portions 12 in the tire-radial direction D2. The tread portion 13 is provided with a tread surface 13a which comes into contact with ground. The tread surface 13a is located on the outer side of in a tire radial-direction D2. The tire 1 is mounted on a rim (not shown).

The tire 1 includes a carcass layer 14 extending between the pair of beads 11a and 11a, and an inner linear 15 located on an inner side of the carcass layer 14 and facing an inner space of the tire 1 into which air is charged. The carcass layer 14 and the inner linear 15 are placed along an inner periphery of the tire over the bead portions 11, the sidewall portions 12 and the tread portion 13.

In FIG. 1 (also in the other drawings), a first direction D1 is a tire width-direction D1 which is parallel to the tire rotation axis, a second direction D2 is the tire radial-direction D2 which is a diameter direction of the tire 1, and a third direction D3 (see FIG. 2) is a tire circumferential-direction D3 which is a direction around a tire axial-direction. A tire equator surface S1 is a surface intersecting with the tire rotation axis at right angle, and is located on a center of the tire width-direction D1, and a tire meridional surface is a surface including a surface including the tire rotation axis, and intersecting with the tire equator surface S1.

Each of the beads 11a includes an annularly formed bead core 11b, and a bead filler 11c placed on an outer side of the bead core 11b in the tire radial-direction D2. For example, the bead core 11b is formed by laminating rubber-coated bead wires (metal wires, for example), and the bead filler 11c is formed by forming hard rubber outward of the tire radial-direction D2 in a tapered manner.

Each of the bead portions 11 includes a rim strip rubber 11d placed on an outer side in the tire width-direction D1 than the carcass layer 14 to configure an outer surface which comes into contact with the rim. Each of the sidewall portions 12 includes a sidewall rubber 12a which is placed on an outer side in the tire width-direction D1 than the carcass layer 14 to configure an outer surface.

The tread portion 13 includes a tread rubber 13b. An outer surface of the tread rubber 13b configures the tread surface 13a. The tread portion 13 also includes a belt portion 13c placed between the tread rubber 13b and the carcass layer 14. The belt portion 13c includes a plurality of (four in FIG. 1) belt plies 13d. For example, each of the belt plies 13d includes a plurality of belt cords (organic fiber or metal, for example) which are arranged in parallel, and topping rubbers for coating the belt cords.

The carcass layer 14 is composed of at least one (two in FIG. 1) carcass plies 14a. Each of the carcass plies 14a is folded back around the bead 11a to surround the bead 11a. Each of the carcass plies 14a includes a plurality of ply cords (organic fiber or metal, for example) which are arranged in a direction intersecting with the tire circumferential-direction D3 substantially at right angles, and topping rubbers for coating the ply cords.

To maintain the air pressure, the inner linear 15 has an excellent function to prevent gas from passing through the inner linear 15. In the sidewall portion 12, the inner linear 15 is in intimate contact with an inner periphery of the carcass layer 14, and no other material is interposed between the inner linear 15 and the carcass layer 14.

For example, in a distance between the carcass ply 14a which is placed on the innermost side and a tire inner peripheral surface (inner peripheral surface of inner linear 15), the distance of the sidewall portion 12 is 90% to 180% of the distance of the tread portion 13. More specifically, the distance of the sidewall portion 12 is 120% to 160% of the distance of the tread portion 13.

An outer surface of the sidewall portion 12 has a position 12b which becomes the same, in the tire radial-direction D2, as the tire maximum position (more specifically, maximum distance position of distance of carcass layer 14 between outer sides in tire width-direction D1). The position 12b is called a tire maximum width position 12b, hereinafter.

The outer surface of the sidewall portions 12 has a position 12c which becomes the same, in the tire radial-direction D2, as an outer end lie of the bead filler 11c in the tire radial-direction D2. The position 12c is called a bead filler outer end position 12c, hereinafter.

Figure 2:
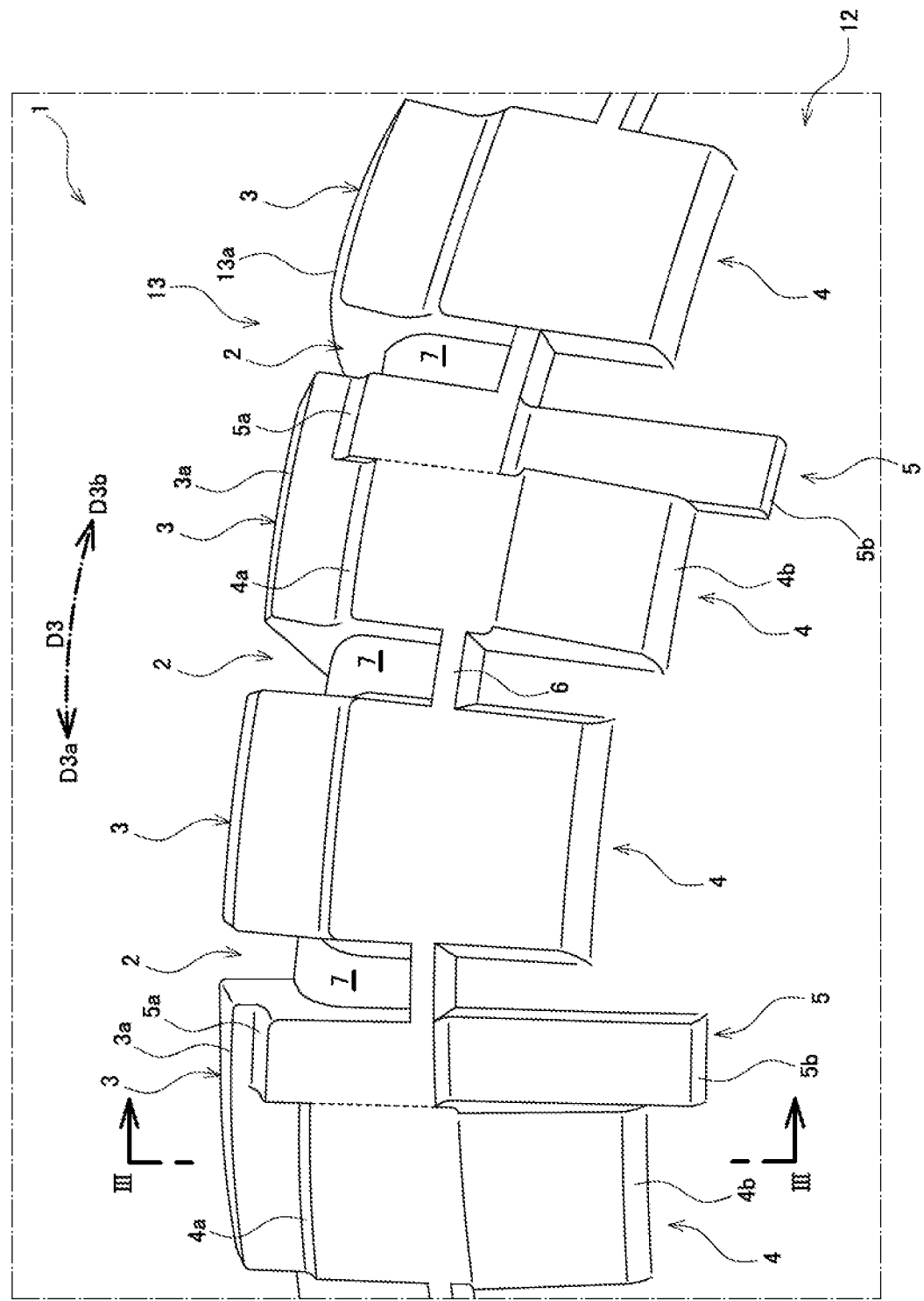
FIG. 2 is a side view of essential portions (perspective view in tire width-direction) of the pneumatic tire of the embodiment.
Figure 3:
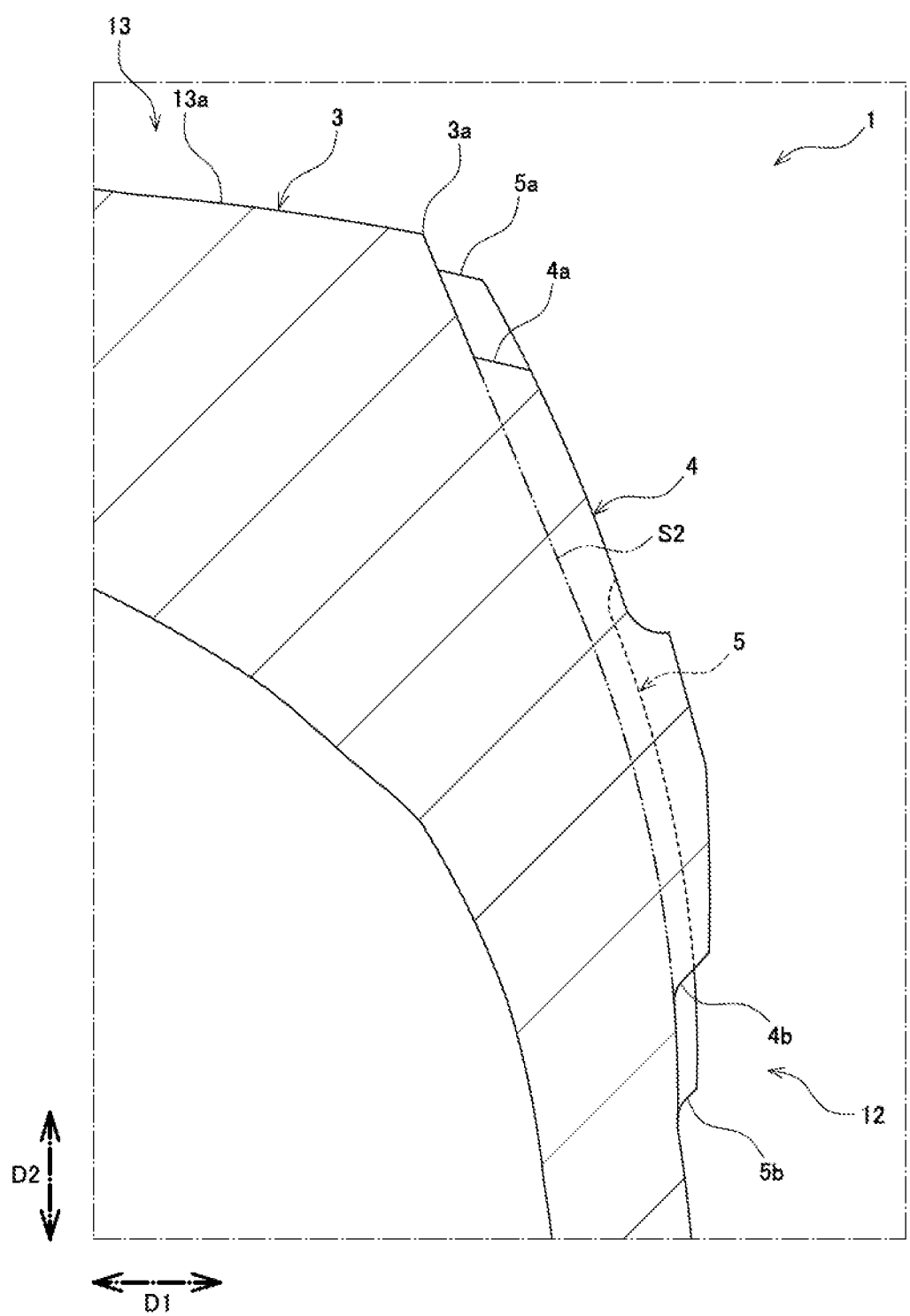
FIG. 3 is an enlarged sectional view of essential portions taken along line III-III of FIG. 2.

As shown in FIGS. 2 and 3, the tread portion 13 includes a plurality of grooves 2 extending outward in the tire width-direction D1, and a plurality of blocks 3 which are defined by the plurality of grooves 2 and arranged in the tire circumferential-direction D3. The sidewall portion 12 includes a plurality of projecting portions 4 which project in the tire width-direction D1, a plurality of reinforcing portions 5 which are connected to the projecting portions 4 in the tire circumferential-direction D3, and an annular protrusion portion 6 which extends along the tire circumferential-direction D3.

One direction side D3a in the tire circumferential-direction D3 also shows a tire rotation direction when the vehicle runs forward. Therefore, the one direction side D3a in the tire circumferential-direction D3 becomes a front side D3a of the tire rotation direction, and the other direction side D3b becomes a rear side D3b of the tire rotation direction.

Each of the projecting portions 4, the reinforcing portions 5 and the annular protrusion portion 6 projects outward in the tire width-direction D1 from a profile surface (a reference surface) S2. A projecting amount of a part of the reinforcing portions 5 is different from a projecting amount of the projecting portions 4 at the same position in the tire radial-direction D2. Further, the projecting amount of the reinforcing portions 5 is equal to or less than the projecting amount of the projecting portions 4 at the same position in the tire radial-direction D2.

Since the reinforcing portions 5 reinforce the projecting portions 4, the projecting amount of the reinforcing portions 5 is equal to or more than 20% of the projecting amount of the projecting portions 4 at the same position in the tire radial-direction D2. Further, the (average) projecting amount of the reinforcing portions 5 is less than the (average) projecting amount of the projecting portions 4.

In the present embodiment, on an outer side in the tire radial-direction D2 than the annular protrusion portion 6, the projecting amount of the reinforcing portions 5 is the same as the projecting amount of the projecting portions 4 at the same position in the tire radial-direction D2. Therefore, on the outer side in the tire radial-direction D2 than the annular protrusion portion 6, a boundary between the projecting portions 4 and the reinforcing portions 5 is flush (the boundary between the projecting portions 4 and the reinforcing portions 5 is shown by a broken line in FIG. 2).

Further, in the present embodiment, on an inner side in the tire radial-direction D2 than the annular protrusion portion 6, the projecting amount of the reinforcing portions 5 is less than the projecting amount of the projecting portions 4 at the same position in the tire radial-direction D2. Therefore, on the inner side in the tire radial-direction D2 than the annular protrusion portion 6, a boundary between the projecting portions 4 and the reinforcing portions 5 forms a step. The boundary line between the projecting portions 4 and the reinforcing portions 5 is formed into a straight line along the tire radial-direction D2.

Further, the projecting portions 4, the reinforcing portions 5 and the annular protrusion portion 6 are placed at least on the outer side in the tire radial-direction D2 of the sidewall portion 12. In the present embodiment, the projecting portions 4, the reinforcing portions 5 and the annular protrusion portion 6 are located on the outer side in the tire radial-direction D2 than the bead filler outer end position 12c (see FIG. 1) of the sidewall portion 12. More specifically, the projecting portions 4 are located on the outer side in the tire radial-direction D2 than the tire maximum width position 12b (see FIG. 1) of the sidewall portion 12.

Accordingly, the projecting portions 4, the reinforcing portions 5 and the annular protrusion portion 6 can come into contact with mud and sand in a state where the tire 1 sinks due to a weight of the vehicle in a mud area and a sand area, and can also come into contact with the uneven rocks in a rocky area. That is, the projecting portions 4, the reinforcing portions 5 and the annular protrusion portion 6 come into contact with the ground in bad roads such as a mud area, a sand area and a rocky area. The projecting portions 4, the reinforcing portions 5 and the annular protrusion portion 6 do not normally come into contact with the ground in a flat road.

As mentioned above, since the uneven shapes formed by the projecting portions 4, the reinforcing portions 5 and the annular protrusion portion 6 exist, components of the surfaces and the edges are formed. Since the uneven shapes are formed on the portions of the tire 1 which come into contact with dirt, sand and rock, areas which come into contact with the dirt, sand and rock become large, and surfaces and edges formed by the uneven shapes easily come into contact with the dirt, sand and rock of various positions. Since the uneven shapes are formed in the portions which come into contact with the dirt, sand and rock, the traction performance is enhanced.

The reinforcing portions 5 are connected to a half number of projecting portions 4 of a plurality of projecting portions 4 arranged in the tire circumferential-direction D3, more specifically, every other projecting portions 4. Further, the reinforcing portions 5 are connected to the rear sides D3b in the tire rotation direction of the projecting portions 4. As a result, since the rigidity of the projecting portions 4 in the tire circumferential-direction D3 is enlarged, it is possible to suppress deformation of the projecting portions 4 when the front sides D3a of the projecting portions 4 in the tire rotation direction come into contact with ground. Therefore, the traction performance is enhanced.

The annular protrusion portion 6 is placed between the projecting portions 4 and 4 which are adjacent away or between the projecting portion 4 and the reinforcing portion 5 which are adjacent away, and is formed into an intermittently annular shape. The projecting amount of the annular protrusion portion 6 is 60% to 130% of the projecting amount of the projecting portions 4 at the same position in the tire radial-direction D2.

Further, the annular protrusion portion 6 has a function, for example, of reinforcing the projecting portions 4 and the reinforcing portions 5. Further, the annular protrusion portion 6 exhibits the traction performance (for example, it is possible to suppress too much sinking of the tire 1 into the sand area), for example, by the outer surface in the tire radial-direction D2 coming into contact with ground.

Outer ends 5a of the reinforcing portions 5 in the tire radial-direction D2 are located on an outer side in the tire radial-direction D2 than outer ends 4a of the projecting portions 4 in the tire radial-direction D2. Accordingly, since the uneven shapes are formed by the step between the outer ends 4a and 5a of the projecting portions 4 and the reinforcing portions 5, the components of the surfaces and the edges are formed in the front sides D3a of the reinforcing portions 5 in the tire rotation direction. Therefore, the traction performance is enhanced.

Further, inner ends 5b of the reinforcing portions 5 in the tire radial-direction D2 are located on an inner side in the tire radial-direction D2 than inner ends 4b of the projecting portions 4 in the tire radial-direction D2. Accordingly, since the uneven shapes are formed by the step between the inner ends 4b and 5b of the projecting portions 4 and the reinforcing portions 5, the components of the surfaces and the edges are formed in the front sides D3a of the reinforcing portions 5 in the tire rotation direction. Therefore, the traction performance is enhanced.

Further, the outer ends 4a and 5a of the projecting portions 4 and the reinforcing portions 5 in the tire radial-direction D2 are located on the inner side in the tire radial-direction D2 than outer ends 3a of the tread surfaces 13a of the blocks 3 in the tire width-direction D1. Accordingly, since the uneven shapes are formed between the outer ends 4a and 5a of the projecting portions 4 and the reinforcing portions 5 and the outer ends 3a of the blocks 3, the components of the surfaces and the edges are formed in the outer ends 4a and 5a of the projecting portions 4 and the reinforcing portions 5. Therefore, the traction performance is enhanced.

Since the reinforcing portions 5 reinforce the projecting portions 4, the (average) length of the reinforcing portions 5 in the tire radial-direction D2 is equal to or more than 20% of the (average) length of the projecting portions 4 in the tire radial-direction D2, preferably equal to or more than 50%. Further, since the rubber weight of the reinforcing portions 5 is enlarged, the (average) length of the reinforcing portions 5 in the tire radial-direction D2 is equal to or less than 150% of the (average) length of the projecting portions 4 in the tire radial-direction D2, preferably equal to or less than 120%, and further preferably equal to or less than 100%, for suppressing the unevenness of the weight balance of the tire 1.

In order to make the rigidity of the projecting portions 4 greater than the rigidity of the reinforcing portions 5, the (average) width of the projecting portions 4 in the tire circumferential-direction D3 is greater than the (average) width of the reinforcing portions 5 in the tire circumferential-direction D3. Since the reinforcing portions 5 reinforce the projecting portions 4, the (average) width of the reinforcing portions 5 in the tire circumferential-direction D3 is equal to or more than 25% of the (average) width of the projecting portions 4 in the tire circumferential-direction D3, preferably equal to or more than 40%.

Further, the projecting portions 4 and the reinforcing portions 5 are placed such that at least portions of the projecting portions 4 and the reinforcing portions 5 are superposed on one of the plurality of blocks 3 in the tire radial-direction D2 as viewed in the tire width-direction D1. That is, the projecting portions 4 and the reinforcing portions 5 are superposed only on one block 3 in the tire radial-direction D2 as viewed in the tire width-direction D1.

The grooves 2 are communicated with space portions 7 which are formed by the projecting portions 4 and the reinforcing portions 5 being arranged in the tire circumferential-direction D3. Accordingly, since the grooves 2 and the space portions 7 connect the components of the surface and the edge of the blocks 3, the projecting portions 4 and the reinforcing portions 5 to some degree, the components of the surface and the edge are enlarged. Therefore, the traction performance is enhanced. Further, since the water and the dirt in the inner portions of the grooves 2 can be discharged to the outer portion via the space portions 7 even if the projecting portions 4 and the reinforcing portions 5 come into contact with ground, it is possible to suppress reduction of the drainage performance.

As described above, the pneumatic tire 1 of the embodiment include a sidewall portion 12 extending in a tire radial-direction D2. The sidewall portion 12 includes a plurality of projecting 4 portions projecting in a tire width-direction D1, and at least one reinforcing portion 5 which is at least partly different in a projecting amount from a projecting amount of the projecting portions 4 at the same position in the tire radial-direction D2, and is connected to the projecting portion 4 in a tire circumferential-direction D3.

According to the above-described configuration, the projecting amount of at least a part of the reinforcing portions 5 is different from the projecting amount of the projecting portions 4 at the same position in the tire radial-direction D2, and the reinforcing portions 5 are connected to the projecting portions 4 in the tire circumferential-direction D3. Accordingly, since the rigidity of the projecting portions 4 in the tire circumferential-direction D3 is enlarged, it is possible to sufficiently exhibit the traction performance of the projecting portions 4.

In the pneumatic tire 1 of the embodiment, at least one of the reinforcing portions 5 is connected to a rear side D3b of the projecting portions 4 in a tire rotation direction.

According to the above-described configuration, since at least one of the reinforcing portions 5 is connected to the rear sides D3b of the projecting portions 4 in the tire rotation direction, it is possible to suppress that the projecting portions 4 deform in such a manner as to fall down toward the rear sides D3b in the tire rotation direction when the front sides D3a of the projecting portions 4 in the tire rotation direction come into contact with the dirt, sand and rock. Accordingly, since it is often the case the projecting portions 4 typically come into contact with the front sides D3a in the tire rotation direction, it is possible to effectively exhibit the traction performance of the projecting portions 4.

In the pneumatic tire 1 of the embodiment, an outer end 5a of the reinforcing portion 5 in the tire radial-direction D2 is located on an outer side in the tire radial-direction D2 than outer ends 4a of the projecting portions 4 in the tire radial-direction D2.

According to the above-described configuration, since the outer ends 5a of the reinforcing portions 5 in the tire radial-direction D2 are located on the outer sides in the tire radial-direction D2 than the outer ends 4a of the projecting portions 4 in the tire radial-direction D2, the portion in the outer ends 5a sides of the reinforcing portions 5 (particularly the surfaces and the edges of the front sides D3a in the tire rotation direction) can come into contact with the dirt, sand and rock. Therefore, since the portion exhibits the traction performance, it is possible to enhance the traction performance as a whole of the tire 1.

The pneumatic tire 1 of the embodiment further has a tread portion 13 which is connected to an outer end of the sidewall portion 12 in the tire radial-direction D2. The tread portion 13 includes a plurality of grooves 2 extending to an outer end in the tire width-direction D1. At least one of the grooves 2 is communicated with space portions 7 which are formed by the plurality of projecting portions 4 and the reinforcing portion 5 being arranged along the tire circumferential-direction D3.

According to the above-described configuration, a plurality of grooves 2 of the tread portion 13 extend to the outer ends in the tire width-direction D1, and are communicated with the space portions 7 which are formed by a plurality of projecting portions 4 and the reinforcing portions 5 being arranged in the tire circumferential-direction D3. Accordingly, since the components of the surfaces and the edges formed by the grooves 2 and the space portions 7 are continuous to some degree, the components of the surfaces and the edges are enlarged. Therefore, it is possible to enhance the traction performance.

The pneumatic tire is not limited to the configuration of the embodiment described above, and the effects are not limited to those described above. It goes without saying that the pneumatic tire can be variously modified without departing from the scope of the subject matter of the present invention. For example, the constituents, methods, and the like of various modified examples described below may be arbitrarily selected and employed as the constituents, methods, and the like of the embodiments described above, as a matter of course.

The pneumatic tire 1 of the embodiment has such a configuration that the reinforcing portions 5 are connected to the half number of projecting portions 4 in a plurality of projecting portions 4. However, the pneumatic tire 1 is not limited to this configuration. For example, the reinforcing portions 5 may be connected to one projecting portion 4 in a plurality of projecting portions 4. It is preferable that the reinforcing portions 5 are connected to at least a half number of projecting portions 4 in a plurality of projecting portions 4, and it is more preferable that the reinforcing portions 5 are connected to a whole number of projecting portions 4.

The pneumatic tire 1 of the embodiment has such a configuration that the projecting amount of the reinforcing portions 5 is equal to or less than the projecting amount of the projecting portions 4 at the same position in the tire radial-direction D2. However, the pneumatic tire 1 is not limited to this configuration. For example, the projecting amount of the reinforcing portions 5 may be greater than the projecting amount of the projecting portions 4 at the same position in the tire radial-direction D2.

The pneumatic tire 1 of the embodiment has such a configuration that the reinforcing portions 5 are connected to the rear sides D3b of the projecting portions 4 in the tire rotation direction. However, the pneumatic tire 1 is not limited to this configuration. For example, the reinforcing portions 5 may be connected to the front sides D3a of the projecting portions 4 in the tire rotation direction. It is preferable that at least a half of the reinforcing portions 5 are connected to the rear sides D3b of the projecting portions 4 in the tire rotation direction, and it is more preferable that a whole number of reinforcing portions 5 are connected to the rear sides D3b of the projecting portions 4 in the tire rotation direction.

The pneumatic tire 1 of the embodiment has such a configuration that the outer ends 5a of the reinforcing portions 5 in the tire radial-direction D2 are located on the outer side in the tire radial-direction D2 than the outer ends 4a of the projecting portions 4 in the tire radial-direction D2. However, the pneumatic tire 1 is not limited to this configuration. For example, the outer ends 5a of the reinforcing portions 5 in the tire radial-direction D2 may be located on the inner side in the tire radial-direction D2 than the outer ends 4a of the projecting portions 4 in the tire radial-direction D2, or may be located at the same position as the outer ends 4a.

The pneumatic tire 1 of the embodiment has such a configuration that the inner ends 5b of the reinforcing portions 5 in the tire radial-direction D2 are located on the inner sides in the tire radial-direction D2 than the inner ends 4b of the projecting portions 4 in the tire radial-direction D2. However, the pneumatic tire 1 is not limited to this configuration. For example, the inner ends 5b of the reinforcing portions 5 in the tire radial-direction D2 may be located on the outer side in the tire radial-direction D2 than the inner ends 4b of the projecting portions 4 in the tire radial-direction D2, or may be located at the same position as the inner ends 4b.

The pneumatic tire 1 of the embodiment has such a configuration that the grooves 2 are communicated with the space portions 7 which are formed by the projecting portions 4 and the reinforcing portions 5 being arranged in the tire circumferential-direction D3. However, the pneumatic tire 1 is not limited to this configuration. For example, the grooves 2 may be displaced from the space portions 7 in the tire circumferential-direction D3, and may not be communicated with the space portions 7.

In the pneumatic tire 1, at least one of the projecting portions 4 and the reinforcing portions 5 may be provided with a recess. For example, the recess may be formed into narrow grooves extending in a predetermined direction or may be formed into openings having circular shapes or rectangular shapes.

What is claimed is:

1. A pneumatic tire, comprising:
a sidewall portion extending in a tire radial-direction,
wherein the sidewall portion includes a plurality of projecting portions projecting in a tire width-direction, and at least one reinforcing portion which is at least partly different in a projecting amount from a projecting amount of the projecting portions at the same position in the tire radial-direction, and is connected to the projecting portion in a tire circumferential-direction, and
further including a tread portion which is connected to an outer end of the sidewall portion in the tire radial-direction,
wherein the tread portion includes a plurality of grooves between a plurality of blocks and extending to an outer end in the tire width-direction,
wherein at least one of the grooves is communicated with space portions which are formed by the plurality of projecting portions and the reinforcing portion being arranged along the tire circumferential-direction,
wherein the projecting portions and the reinforcing portion are placed such that at least portions of the projecting portions and the reinforcing portion are superposed on only one of the plurality of blocks in the tire radial-direction as viewed in the tire width-direction,
wherein an outer end of the reinforcing portion in the tire radial-direction is located on an outer side in the tire radial-direction than outer ends of the projecting portions in the tire radial-direction,
wherein a first end at a first side in the tire circumferential-direction of the at least one reinforcing portion is in contact with a first one of the projecting portions,
wherein a second end at a second side opposite the first side in the tire circumferential-direction of the at least one reinforcing portion is not in contact with any of the projecting portions,
wherein at least one of the space portions is disposed between the at least one reinforcing portion and a second one other than the first one of the projecting portions, the second one of the projecting portions being adjacent on the second side to the at least one reinforcing portion, and
wherein a projecting amount of the reinforcing portion is the same as a projecting amount of the projecting portion at a radially outermost position of the axially outermost surface along a boundary between the projecting portion and the reinforcing portion such as to form a flush boundary between the projecting portion and the reinforcing portion at said radially outermost position, and a projecting amount of the reinforcing portion is different from a projecting amount of the projecting portion at a radial inner position that is more radially inner than said radial outermost position such as to form a step between the projecting portion and the reinforcing portion at said radially inner position.

2. The pneumatic tire according to claim 1, wherein at least one of the reinforcing portions is connected to a rear side of the projecting portions in a tire rotation direction.

3. The pneumatic tire according to claim 1, wherein an outer end of the projecting portion in the tire radial-direction is located on an inner side in the tire radial-direction than an outer end of the tread surface of the block in the tire width-direction.

4. The pneumatic tire according to claim 1, wherein an outer end of the reinforcing portion in the tire radial-direction is located on an inner side in the tire radial-direction than an outer end of the tread surface of the block in the tire width-direction.

5. The pneumatic tire according to claim 1, wherein the projecting amount of the reinforcing portion is equal to or more than 20% of the projecting amount of the projecting portion at the same position in the tire radial-direction.

6. The pneumatic tire according to claim 1, wherein a width of the projecting portions in a tire circumferential-direction is greater than a width of the reinforcing portion in the tire circumferential-direction.

7. The pneumatic tire according to claim 6, wherein the width of the reinforcing portion in the tire circumferential-direction is equal to or more than 25% of the width of the projecting portion in the tire circumferential-direction.

8. The pneumatic tire according to claim 7, wherein the width of the reinforcing portion in the tire circumferential-direction is equal to or more than 40% of the width of the projecting portion in the tire circumferential-direction.

9. The pneumatic tire according to claim 1, wherein a length of the reinforcing portion in the tire radial-direction is equal to or more than 20% of a length of the projecting portion in the tire radial-direction.

10. The pneumatic tire according to claim 9, wherein the length of the reinforcing portion in the tire radial-direction is equal to or more than 50% of the length of the projecting portion in the tire radial-direction.

11. The pneumatic tire according to claim 1,
wherein the pneumatic tire further comprises an annular protrusion portion disposed between the projecting portions which are adjacent away or between the projecting portion and the reinforcing portion which are adjacent away, and formed into an intermittently annular shape.

12. A pneumatic tire, comprising:
a sidewall portion extending in a tire radial-direction,
wherein the sidewall portion includes a plurality of projecting portions projecting in a tire width-direction, and at least one reinforcing portion which is at least partly different in a projecting amount from a projecting amount of the projecting portions at the same position in the tire radial-direction, and is connected to the projecting portion in a tire circumferential-direction,
further comprising an annular protrusion portion placed between the projecting portions which are adjacent away or between the projecting portion and the reinforcing portion which are adjacent away, and formed into an intermittently annular shape, and
wherein the projecting amount of the reinforcing portion is the same as the projecting amount of the projecting portion at the same position in the tire radial-direction on an outer side in the tire radial-direction than the annular protrusion portion, and is smaller than the projecting amount of the projecting portion at the same position in the tire radial-direction on an inner side in the tire radial-direction than the annular protrusion portion.

13. The pneumatic tire according to claim 12, wherein the projecting amount of the annular protrusion portion is 60% to 130% of the projecting amount of the projecting portion at the same position in the tire radial-direction.

14. A pneumatic tire, comprising:
a sidewall portion extending in a tire radial-direction,
wherein the sidewall portion includes a plurality of projecting portions projecting in a tire width-direction, and at least one reinforcing portion which is at least partly different in a projecting amount from a projecting amount of the projecting portions at the same position in the tire radial-direction, and is connected to the projecting portion in a tire circumferential-direction, and
further including a tread portion which is connected to an outer end of the sidewall portion in the tire radial-direction,
wherein the tread portion includes a plurality of grooves between a plurality of blocks and extending to an outer end in the tire width-direction,
wherein at least one of the grooves is communicated with space portions which are formed by the plurality of projecting portions and the reinforcing portion being arranged along the tire circumferential-direction,
wherein the projecting portions and the reinforcing portion are placed such that at least portions of the projecting portions and the reinforcing portion are superposed on only one of the plurality of blocks in the tire radial-direction as viewed in the tire width-direction,
wherein an outer end of the reinforcing portion in the tire radial-direction is located on an outer side in the tire radial-direction than outer ends of the projecting portions in the tire radial-direction, and
wherein the length of the reinforcing portion in the tire radial-direction is equal to or less than 100% of a length of the projecting portion in the tire radial-direction.

15. A pneumatic tire, comprising:
a sidewall portion extending in a tire radial-direction,
wherein the sidewall portion includes a plurality of projecting portions projecting in a tire width-direction, and at least one reinforcing portion which is at least partly different in a projecting amount from a projecting amount of a first one of projecting portions at the same position in the tire radial-direction, and which is connected to the first projecting portion in a tire circumferential-direction,
wherein a first end at a first side in the tire circumferential-direction of the at least one reinforcing portion is in contact with the first projecting portions,
wherein a second end at second side opposite the first side in the tire circumferential-direction of the at least one reinforcing portion is not in contact with any of the projecting portions,
wherein a position of an outer end in the tire radial-direction of the at least one reinforcing portion is different in the tire radial-direction from a position in the tire radial-direction of an outer end of the first projecting portion,
wherein a position of an inner end in the tire radial-direction of the at least one reinforcing portion is different in the tire radial-direction from a position in the tire radial-direction of an inner end of the first projecting portion,
wherein the outer end of the at least one reinforcing portion in the tire radial-direction is located on an outer side in the tire radial-direction than the outer end of the first projecting portion in the tire radial-direction, and wherein the inner end of the at least one reinforcing portion in the tire radial-direction is located on an outer side in the tire radial-direction than the inner end of the first projecting portion in the tire radial-direction.

16. The pneumatic tire according to claim 15,
wherein the pneumatic tire further comprises an annular protrusion portion disposed between the projecting portions which are adjacent away or between the projecting portion and the reinforcing portion which are adjacent away, and formed into an intermittently annular shape.

17. A pneumatic tire, comprising:
a sidewall portion extending in a tire radial-direction,
wherein the sidewall portion includes a plurality of projecting portions projecting in a tire width-direction, and at least one reinforcing portion which is at least partly different in a projecting amount from a projecting amount of a first one of projecting portions at the same position in the tire radial-direction, and which is connected to the first projecting portion in a tire circumferential-direction,
wherein a first end at a first side in the tire circumferential-direction of the at least one reinforcing portion is in contact with the first projecting portions,
wherein a second end at second side opposite the first side in the tire circumferential-direction of the at least one reinforcing portion is not in contact with any of the projecting portions,
wherein a position of an outer end in the tire radial-direction of the at least one reinforcing portion is different in the tire radial-direction from a position in the tire radial-direction of an outer end of the first projecting portion,
wherein a position of an inner end in the tire radial-direction of the at least one reinforcing portion is different in the tire radial-direction from a position in the tire radial-direction of an inner end of the first projecting portion,
wherein the outer end of the at least one reinforcing portion in the tire radial-direction is located on an inner side in the tire radial-direction than the outer end of the first projecting portion in the tire radial-direction, and
wherein the inner end of the at least one reinforcing portion in the tire radial-direction is located on an inner side in the tire radial-direction than the inner end of the first projecting portion in the tire radial-direction.

18. The pneumatic tire of claim 17,
wherein the pneumatic tire further comprises an annular protrusion portion disposed between the projecting portions which are adjacent away or between the projecting portion and the reinforcing portion which are adjacent away, and formed into an intermittently annular shape.

* * * * *